United States Patent
Chaves et al.

(10) Patent No.: US 6,546,083 B1
(45) Date of Patent: Apr. 8, 2003

(54) SYSTEM AND METHOD FOR PLACING A TELEPHONE CALL

(75) Inventors: Gerardo Chaves, San Jose, CA (US); John F. Wakerly, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/477,302

(22) Filed: Jan. 4, 2000

(51) Int. Cl.$^7$ .............................................. H04M 1/64
(52) U.S. Cl. ............... 379/88.03; 379/233; 379/265.02; 379/309
(58) Field of Search ............................ 379/88.01, 88.03, 379/88.16, 201.01, 233, 265.02, 309

(56) References Cited

U.S. PATENT DOCUMENTS

| | | | |
|---|---|---|---|
| 4,696,028 A | * | 9/1987 | Morganstein et al. ......... 379/88 |
| 4,949,373 A | * | 8/1990 | Baker, Jr. et al. ............. 379/96 |
| 4,975,941 A | * | 12/1990 | Morganstein et al. ......... 379/88 |
| 5,268,958 A | * | 12/1993 | Nakano ....................... 379/211 |
| 5,303,298 A | * | 4/1994 | Morganstein et al. ......... 379/67 |
| 5,392,346 A | * | 2/1995 | Hassler et al. ............... 379/265 |
| 5,422,940 A | * | 6/1995 | Endo et al. .................. 379/207 |
| 5,666,401 A | * | 9/1997 | Morganstein et al. ......... 379/67 |
| 6,249,570 B1 | * | 6/2001 | Glowny et al. .......... 379/88.22 |

\* cited by examiner

*Primary Examiner*—Creighton Smith
(74) *Attorney, Agent, or Firm*—Baker Botts L.L.P.

(57) ABSTRACT

The present invention provides a system for placing a telephone call using a telephone number and an extension. The system includes an origination device that receives a telephone number and an extension associated with a destination device and initiates the establishment of a communication path to the destination device by issuing the telephone number. In addition, the origination device determines whether a condition to issue the extension has been satisfied and issues the extension to complete the establishment of the communication path if the condition has been satisfied. The destination device includes a first destination device and a plurality of second destination devices. The first destination device can be contacted based on the telephone number and also receives the extension to complete the establishment of the communication path by selecting the appropriate second destination device to which to place the telephone call.

72 Claims, 4 Drawing Sheets

| | NAME 162 | NUMBER 164 | AUTOMATED ATTENDANT 171 | DIAL AFTER DELAY (s) 172 | DIAL ON ANSWER 173 | DIAL ON COMMAND 174 | SPEAK EXT ON ANSWER 175 | SPEAK EXT ON COMMAND 176 | SPEAK NAME ON COMMAND 177 |
|---|---|---|---|---|---|---|---|---|---|
| 160a | WAN, GENE | (214) 953-1222 x 6131 | Y | 5 | | | | | |
| 160b | SMITH, MARK | (214) 953-1222 x 6198 | Y | | | Y | | | |
| ... | GREEN, CHRIS | (214) 953-1222 x 6122 | Y | | Y | | | | Y |
| | DILLON, FRANK | (972) 214-6503 | N | | Y | | | | |
| | LOO, SAM | 1-800-234-9253 x 124 | Y | 3 | | | | | |
| 160f | GOOD SPORTS | 1-800-GSPORTS x 12 | N | | | | | | |
| 160g | MOTHER | 1-(830) 621-4936 | N | | | | | Y | |
| | WIFE (WORK) | (972) 836-2199 x 1298 | | | | | Y | | |
| ... | ... | ... | | | | | | | |
| 160z | SCOTT, CHAD | (214) 303-1234 x 625 | Y | | | Y | | | |

SYSTEM AND METHOD FOR PLACING A TELEPHONE CALL

TECHNICAL FIELD OF THE INVENTION

This invention relates to placing telephone calls and, in particular, to placing telephone calls using a telephone number and an extension.

BACKGROUND OF THE INVENTION

Systems for dialing a telephone number to place a call for a user are commonly available. These systems typically use a computer program to dial a telephone number that the user has entered or selected. Unfortunately, these systems do not work well for destinations that have a two part telephone number, such as a standard telephone number and an extension. These known systems do not understand what to do with an extension, if they are even able to detect it, and there are a variety of conditions that must be met before dialing the extension.

SUMMARY OF THE INVENTION

The present invention substantially reduces or eliminates at least some of the problems and disadvantages associated with previous systems for placing a telephone call. Accordingly, the present invention provides systems and methods for placing a telephone call using a telephone number and an extension that reduce required user input, decreasing the time, effort, and errors in placing a telephone call using a telephone number and an extension.

One embodiment of the present invention provides a system for placing a telephone call using a telephone number and an extension. The system includes an origination device that is operable to receive a telephone number and an extension associated with a destination device, initiate the establishment of a communication path to the destination device by issuing the telephone number, determine whether a condition to issue the extension has been satisfied, and issue the extension to complete the establishment of the communication path if the condition has been satisfied. The system also includes a communication network coupled to the origination device. The communication network is operable to receive the telephone number, establish contact with the destination device based on the telephone number, receive the extension, and route the extension to the destination device. The system further includes the destination device. The destination device includes a first destination device coupled to the communication network and a plurality of second destination devices coupled to the first destination device. The first destination device is operable to be contacted through the communication network based on the telephone number, to receive the extension through the communication network, and to complete the establishment of the communication path based on the extension by selecting the appropriate second destination device to which to place the telephone call.

Another embodiment of the present invention provides a method for placing a telephone call using a telephone number and an extension. The method includes receiving a telephone number and an extension associated with a destination device at an origination device, initiating the establishment of a communication path to the destination device by issuing the telephone number to a communication network. The method also includes receiving the telephone number at the communication network and establishing contact with a first destination device of the destination device through the communication network based on the telephone number. The method further includes determining at the origination device whether a condition to issue the extension has been satisfied and issuing the extension to complete the establishment of the communication path if the condition has been satisfied. The method also includes receiving the extension at the communication network, routing the extension to the first destination device through the communication network, receiving the extension at the first destination device, and selecting the appropriate one of a plurality of second destination devices coupled to the first destination device to place the telephone call to based on the extension to complete the establishment of the communication path based on the extension.

The present invention has several important technical features and advantages. To begin, the origination device is able to recognize when an extension is associated with a telephone number and provide options for issuing the extension. By recognizing an extension and providing options for issuing the extension, the origination device provides accurate issuance of the telephone number and extension, which reduces user input errors and effort in placing telephone calls. Further, the origination device provides efficient electronic issuance of the telephone number and extension. The origination device also offers efficient issuance of the extension for certain destination devices by automating the issuance of the extension in response to a triggering event, relieving the user of the origination device from performing the function.

Other technical features and advantages will be readily apparent to one skilled in the art from the following figures, description, and claims.

BRIEF DESCRIPTION OF THE DRAWINGS

For a more complete understanding of the present invention, and for further features and advantages, reference is now made to the following description taken in conjunction with the accompanying drawings, where like reference numerals represent like parts, in which:

FIG. 4 illustrates an arrangement of data maintained by the system and stored in a telephone directory.

DETAILED DESCRIPTION OF THE INVENTION

Figure 1:
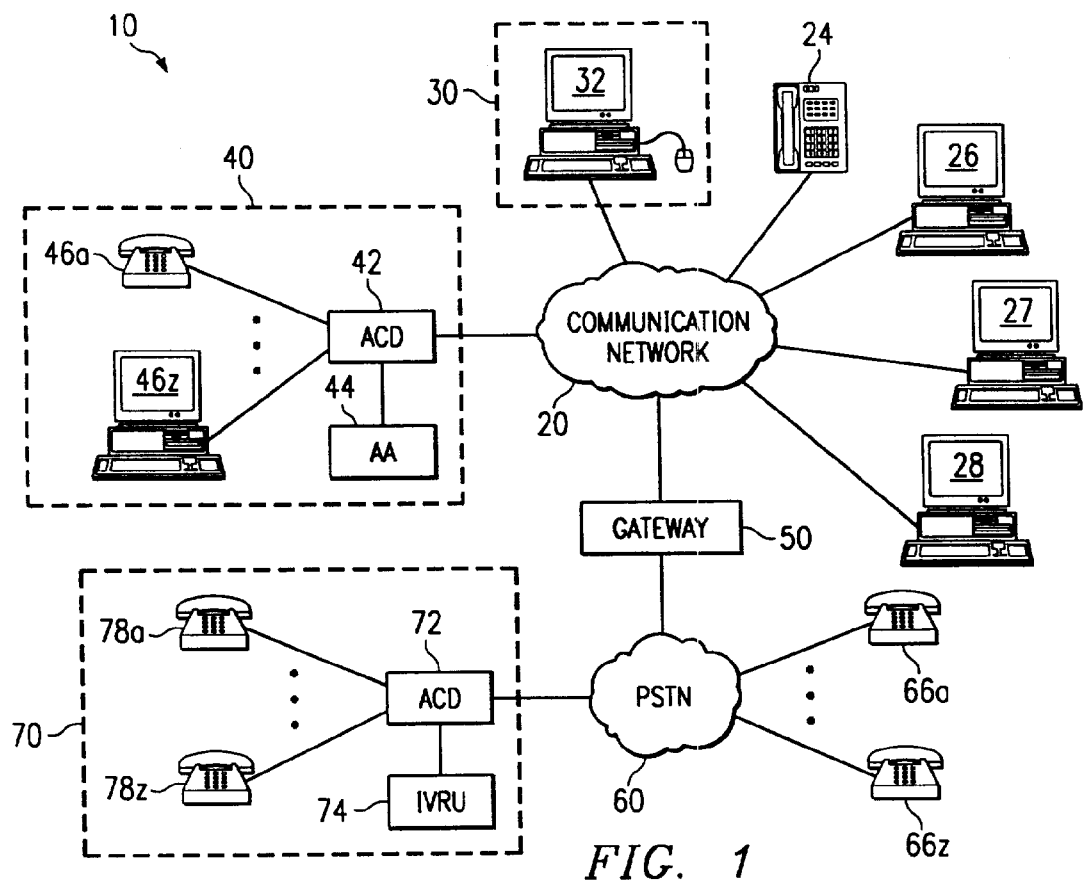
FIG. 1 illustrates an embodiment of a system for placing a telephone call using a telephone number and an extension in accordance with the teachings of the present invention.

FIG. 1 illustrates an embodiment of a system 10 for placing a telephone call using a telephone number and an extension in accordance with the teachings of the present invention. In general, system 10 includes a communication network 20 that facilities the exchange of electrical communications between an origination device 30 and a variety of destination devices, such as a destination device 40.

Communication network 20 can be a packet-switched network, an asynchronous transfer mode (ATM) network, the Public Switched Telephone Network (PSTN), a cellular telephone network, any combination of these, or any other type of analog and/or digital communication network using any combination of wireline and/or wireless technology to facilitate the exchange of electrical communications. Communication network 20 can also facilitate the exchange of electrical communications between computers 26–28 through techniques well known to those of skill in the art. In addition, communication network 20 can facilitate the exchange of electrical communications between a telephone 24 and either origination device 30 or destination device 40 through techniques well known to those skilled in the art. Note, computers 26–28 and telephone 24 are not necessary for origination device 30 to place a call to destination device 40 through communication network 20, but are shown to illustrate the nature of communication network 20. Communication network 20 can support any of a variety of other communication devices that can exchange electrical communications.

In particular embodiments, communication network 20 may have two communication plane, one for the actual communication exchange and one for control. Either one or both planes may be used in placing a call. In these embodiments, communication network 20 can support different protocols for each plane. For instance, if communication network 20 is a packet switched network, it may, for example, use H.225 for control and Real Time Protocol (RTP) for the communication exchange. On the other hand, if communication network 20 is a circuit switched network it may use Signaling System 7 (SS7) for control and dual-tone multifrequency (DTMF) signals for the communication exchange. Other protocols well known to those of skill in the art may also be used for these and other types of communication networks.

As illustrated in FIG. 1, origination device 30 includes a computer 32 that performs telephony functions. In addition, destination device 40 includes an automatic call distributor (ACD) 42 coupled to an automated attendant (AA) 44, which together form a type of first destination device. In addition, destination device 40 further includes a plurality of second destination devices 46a–z (generally referred to as second destination devices 46) coupled to ACD 42.

Computer 32 of origination device 30 can be a personal computer, a workstation, a personal digital assistant (PDA), a cellular telephone, or any other type of telephony device that can store, manipulate, and/or display electronic data. In particular embodiments, computer 32 performs telephony functions for a co-located telephone that is also part of origination device 30. Computer 32 can use in-band signaling, such as DTMF signals or RTP signals, or out-of-band signaling, such as SS7 signals or H.225 signals, to place telephone calls to destination device 40.

Destination device 40 can use any of a variety of devices for the first destination device and second destination devices 46. As illustrated, the first destination device includes ACD 42 and AA 44. However, the first destination device could also be ACD 42 alone, a private branch exchange (PBX), a PBX with an Interactive Voice Response Unit (IVRU), or any other type of hardware and/or software that can receive a call and distribute it to one of selected second destination devices 46. In addition, the first destination device could be controlled by a human operator who answers telephone calls to the first destination device and selects the appropriate one of second destination devices 46 to place the call to based on the extension. Second destination devices 46 can be any type of communication device that can exchange electrical communications with communication network 20. For example, as illustrated in FIG. 1, second destination device 46a is a telephone and second destination device 46z is a personal computer that can perform telephony functions.

To place a call from origination device 30 to destination device 40, computer 32 receives a telephone number, which can be a standard telephone number, an Internet Protocol (IP) address, or any type of alphanumeric communication address, and an extension, which can also be any type of alphanumeric communication address, associated with destination device 40. Computer 32 initiates the establishment of a communication path to destination device 40 by issuing the telephone number to communication network 20. Communication network 20 receives the telephone number from computer 32 and establishes contact with ACD 42 of destination device 40 based on the telephone number. After issuing the extension, computer 32 determines whether a condition to issue the extension has been satisfied. Once computer 32 determines that the condition to issue the extension has been satisfied, computer 32 issues the extension to complete the establishment of the communication path to one of second destination devices 46. Note, computer 32 can use either in-band signaling or out-of-band signaling to issue the telephone number and/or the extension. Communication network 20 receives the extension and routes it to ACD 42 of destination device 40. ACD 42, in turn, receives the extension and selects one of second destination devices 46, such as second destination device 46a, to which to complete the telephone call based on the extension.

The condition that must be satisfied before origination device 30 will issue the extension can be based on any of a variety of functions associated with telephony. For example, origination device 30 may use the elapse of a predetermined period of time after issuing the telephone number as the condition for issuing the extension. Such a condition may be useful where the call connection time between origination device 30 and the first destination device of destination device 40 is fairly constant. As another example, origination device 30 may use the detection of an appropriate response from the first destination as the condition. For instance, origination device 30 may use the answering of the call by the first destination device as the condition. Origination device 30 can perform this function if it can, for example, detect an off-hook signal from the first destination device or any other suitable in-band or out-of-band signaling that indicates an off-hook or answered condition. Origination device 30 may also perform this function if it can detect speech from the first destination device. Origination device 30 may again use in-band signaling or out-of-band signaling in making this type of detection. In addition, origination device 30 can wait to detect a user input at origination device 30 before issuing the extension. A variety of other conditions for issuing the extension exist.

In particular embodiments, origination device 30 may use a combination of conditions as the condition for issuing the extension. An example of this would be using the detection of an appropriate response from the first destination device and the elapse of a predetermined period of time after the detection of the appropriate response as the condition. In general, a variety of conditions can be combined in a variety of manners to establish a condition for issuing the extension.

The extension can be issued in a variety of forms. For example, origination device 30 may issue the extension by generating dual-tone multifrequency (DTMF) signals that represent the extension or any other form of in-band or out-of-band electrical communication that can represent the extension. In particular embodiments, origination device 30 may include a voice synthesis unit that can issue the extension as an audible voice request, using synthesized speech. This would be particularly useful if it was known that a human would be operating the first destination device of destination device 40 or when no extension is associated with the telephone number. Further, in some of these embodiments, origination device 30 may issue the extension by generating an audible voice request to connect to a name associated with the telephone number. This option may be especially useful when there is no extension associated with a telephone number but there are still a plurality of second destination devices associated with the telephone number. Thus, there are a variety of forms for issuing the extension.

In particular embodiments, a combination of techniques for issuing the extension may be used. For instance, origination device 30 may issue the extension by generating an audible voice request to connect to the extension followed by DTMF signals that represent the extension. This technique for issuing the extension may be especially useful if origination device 30 includes voice recognition software that can determine whether a human voice has answered the telephone call at the first destination device. In this instance, whether the voice is actually associated with a human or a computer the telephone call can be appropriately placed. Of course, the DTMF signals would need to be issued at a reduced volume level in case a human actually answered the call.

In certain embodiments, origination device 30 can exchange electrical communications with destination devices coupled to other communication networks. For example, as illustrated in FIG. 1, origination device 30 can exchange communications with destination device 70. To accomplish this, a gateway 50 is coupled to communication network 20 and a PSTN 60. PSTN 60 generally supports exchanges of electrical communications between telephones 66a–z coupled to PSTN 60. Destination device 70 is also coupled to PSTN 60. Destination device 70 can include any types of first destination device and second destination devices discussed with respect to destination device 40. As illustrated in FIG. 1, the first destination device of destination device 70 includes an ACD 72 and an interactive voice response unit (IVRU) 74. ACD 72 is coupled to PSTN 60, and a plurality of second destination devices 78a–z are coupled to ACD 72.

The operation of origination device 30, communication network 20, and destination device 70 in establishing a communication path between origination device 30 and destination device 70 is quite similar to the operation of origination device 30, communication network 20, and destination device 40 in establishing a communication path between origination device 30 and destination device 40. However, gateway 50 acts as an intermediary between communication network 20 and PSTN 60. In general, gateway 50 can act as an intermediary between any types of communication networks to facilitate the establishment of a communication path between origination device 30 and a destination device, such as destination device 70.

Figure 2:
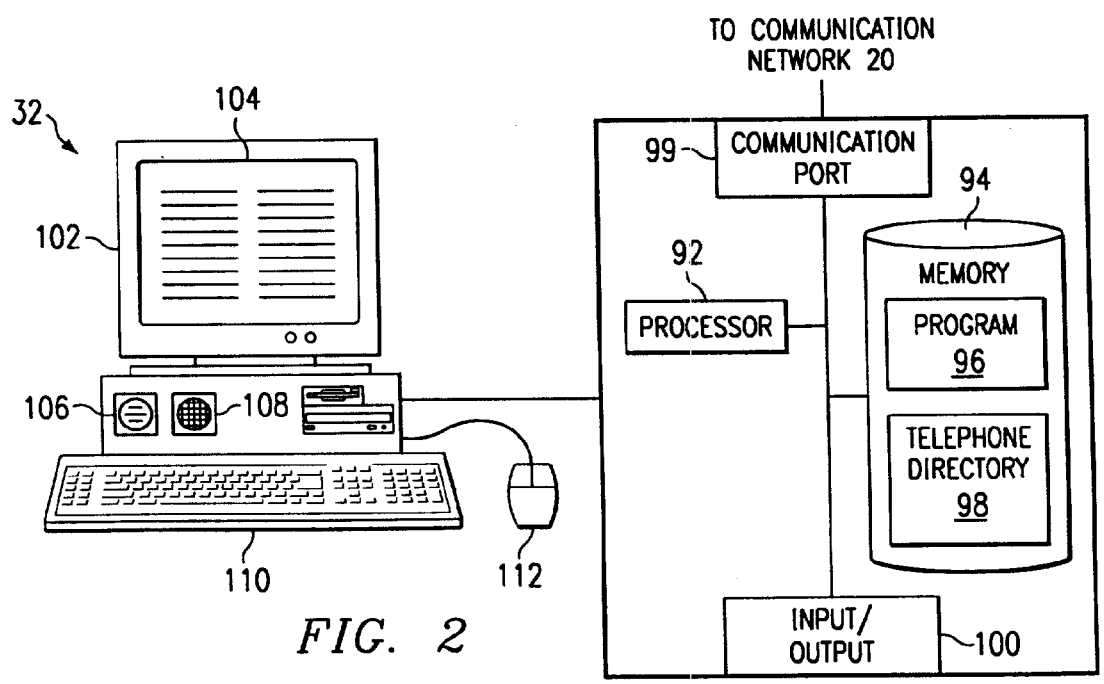
FIG. 2 provides a more detailed view of an origination device for use in the system.

FIG. 2 provides a more detailed view of computer 32, which is a type of origination device 30. Computer 32 includes a processor 92 coupled to a memory 94. Memory 94 includes a program 96 that contains instructions for processor 92 and a telephone directory 98. Processor 92 is also coupled to a communication port 99 so that processor 92 may exchange electrical communications with communication network 20. In addition, processor 92 is coupled to input/output interface 100, which receives input from and sends output to a user of computer 32. Computer 32 can also include a variety of input devices, such as a microphone 106, a keyboard 110, and/or a mouse 112. Computer 32 can further include a variety of output devices, such as a display device 102 and/or a speaker 108.

Processor 92 can be a complex instruction set computer (CISC), a reduced instruction set computer (RISC), or any other type of device that can electronically manipulate electronic data. Memory 94 can be random access memory (RAM), read-only memory (ROM), compact disk read-only memory (CD-ROM), registers, or any other type of electromagnetic or optical volatile or nonvolatile computer memory. Display device 102 can be a cathode-ray tube (CRT) display, a liquid crystal display (LCD), an active matrix display (AMD), or any other device that is capable of electronically displaying an image that is generated by processor 92.

In operation, display device 102 displays at least part of the data in telephone directory 98 of memory 94 in a user interface (UI) 104 generated by processor 92. The data in telephone directory 98 is segmented into telephone data sets, each telephone data set containing one combination of name, telephone number, extension, if any, and any associated data, which will be discussed in detail with respect to FIG. 4. Each telephone data set can be any combination of data that allows a user of computer 32 to select a telephone number and extension associated with one of second destination devices 46 of destination device 40, or a second destination device of any other destination device. Note, some of the telephone data sets could contain data for establishing a communication path to communication devices that have no extension, such as telephone 24 or telephone 66a. When processor 92 detects the selection of one of the data sets of telephone directory 98 displayed in UI 104, processor 92 initiates the establishment of a communication path to destination device 40 by issuing the telephone number to communication network 20 using appropriate in-band or out-of-band signaling. After this, processor 92 determines whether a condition to issue the extension, such as those discussed previously, has been satisfied. Once the condition for issuing the extension has been satisfied, processor 92 issues the extension to communication network 20 through communication port 99. Then, communication exchanges, such as exchanges of audible sounds, can be undertaken between computer 32 and one of second destination devices 46. Processor 92 could also initiate the establishment of a communication path to a destination device without an extension, such as telephone 24 or telephone 66a.

Figure 3:
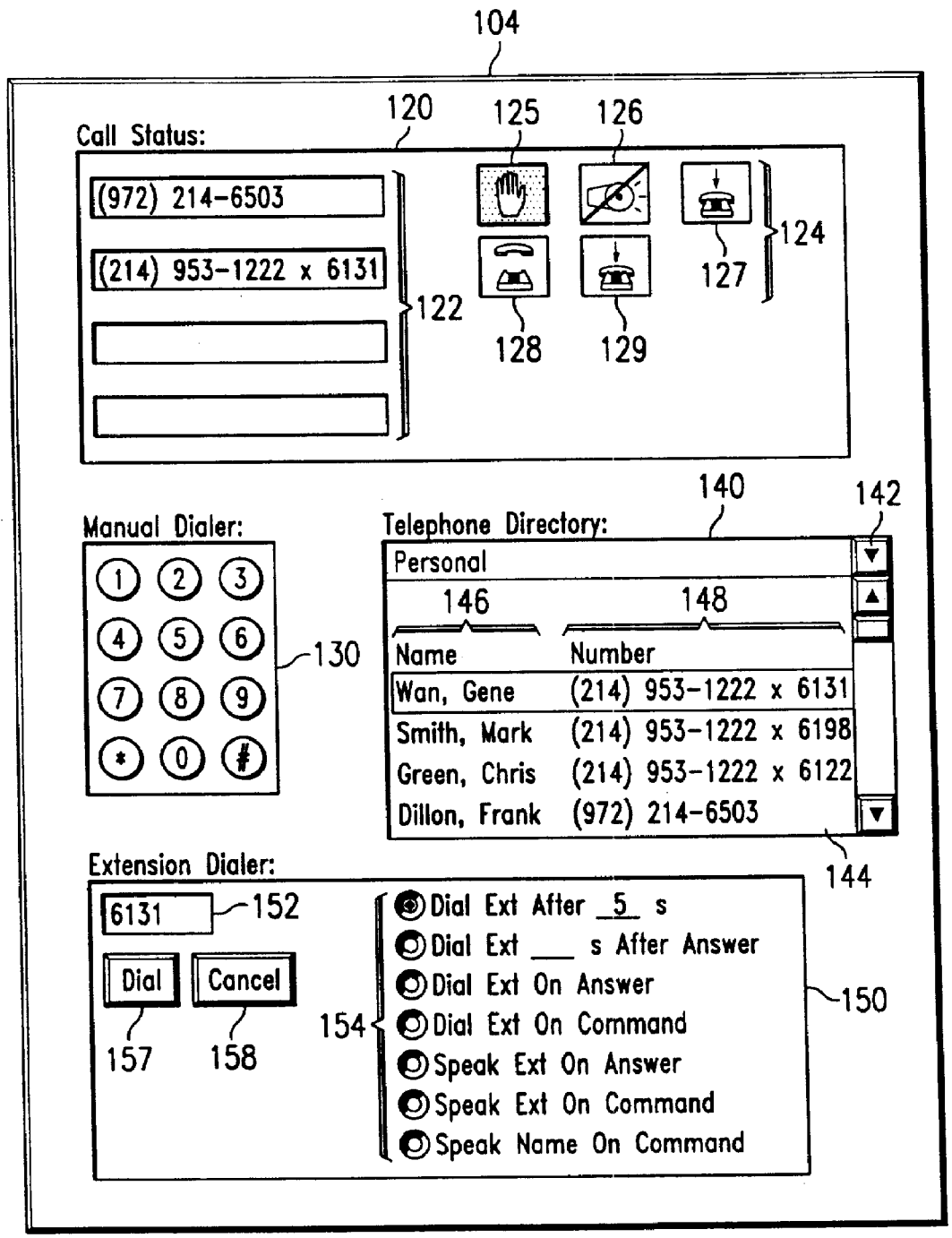
FIG. 3 illustrates a user interface generated and displayed by the origination device.

FIG. 3 illustrates UI 104, which is generated by processor 92 and displayed by display device 102. As illustrated in FIG. 3, UI 104 provides a user of computer 32 with a variety of telephony functions, such as a call status section 120, a manual dialer section 130, a telephone directory section 140, and extension dialer section 150.

Although UI 104 has been illustrated in FIG. 3, UI 104 could be composed in a variety of other manners well known to those of skill in the art. In addition, UI 104 could be a command-driven interface, a menu-driven interface, a graphical user interface (GUI), or any other type of user/computer interface that allows a user to observe and manipulate data.

Call status section 120 conveys the status of calls that are being handled by program 96. Telephone number blocks 122 list the telephone number and any associated extension of each call that is currently being handled by program 96. Associated with each telephone number in one of telephone number blocks 122 are buttons that provide different telephone functions in telephony section 124. For example, for the first telephone number in telephone number blocks 122, buttons 125–127 in telephony section 124 are available for the user to select between. Currently, the telephone call to the first telephone number in telephone number blocks 122 is connected. Thus, the user has the option of placing the call on hold by activating button 125, placing the call on mute by activating button 126, or disconnecting the call by activating button 127. Currently, the call to the first telephone number is on hold because button 125 is activated. The call to the second telephone number in telephone number blocks 122 is just being initiated by the user of computer 32. Thus, the user has the option of initiating the call by activating button 128 or canceling the call by activating button 129. A variety of other telephony functions can be provided by other buttons in telephony section 124.

Manual dialer section 130 allows the user of computer 32 to place telephone calls as if using a standard telephone. Thus, manual dialer section 130 presents the user with a set of buttons that are found on a standard telephone.

Telephone directory section 140 displays at least part of the data stored in telephone directory 98 of memory 94. Telephone directory section 140 includes a display section 144 that displays all or a portion of the telephone data sets in telephone directory 98. As illustrated, display section 144 has a name column 146, which displays the names of people in telephone directory 98, and a number column 148, which displays a telephone number and associated extension, if any, associated with each name in name column 146. An entry may be selected in telephone directory section 140 using any appropriate input device of computer 32. Telephone directory section 140 also includes a pull-down menu 142 in which the user can select between different groupings of telephone data sets in telephone directory 98 to be displayed in telephone directory section 140.

UI 104 also includes extension dialer section 150. Extension dialer section 150 is used to issue the extension associated with a telephone number. Extension display box 152 displays the extension associated with the telephone number to which a telephone call is currently being placed. Extension dialer section 150 also includes a plurality options for issuing the extension in extension issuing options 154. Extension issuing options 154 may include dialing the extension after a time delay, dialing the extension a time period after detecting an answer, dialing the extension on detecting an answer, dialing the extension on command, speaking the extension number on detecting an answer, speaking the extension number on command, speaking the name associated with the telephone number on command, or any other triggering event to issue the extension using telephony signaling and/or voice synthesis. A user of computer 32 may select between the options in extension issuing options 154. Note, a variety of other options for issuing the extension exist, such as speaking the name associated with the telephone number on detecting an answer. Extension dialer section 150 further includes buttons 157–158. Upon activation of button 157, processor 92 issues the extension to communication network 20. The activation of button 158 renders extension dialer section 150 inactive.

In operation, parts of the telephone data sets in telephone directory 98 are displayed in telephone directory section 140 of UI 104. A subset of this data may be selected by specifying particular groupings in pull-down menu 142. As illustrated in FIG. 3, telephone directory section 140 displays telephone numbers that a user of computer 32 has designated as personal numbers. Other groupings might include all numbers, work numbers, or any other logical grouping desired by the user. Upon selection of an entry, a line as illustrated, in telephone directory section 140, the telephone number and any associated extension are displayed in one of telephone number blocks 122. As illustrated, the first entry in telephone directory section 140 has been selected, and therefore, the telephone number and extension in number column 148 appears in the second block of telephone number blocks 122, the first block representing a call already in progress. Note, the telephone number and extension appear in one of telephone number blocks 122 so that a user of computer 32 can determine which of second destination devices 46 she is calling. In addition, if an extension is associated with the entry selected in telephone directory section 140, extension dialer section 150 is activated. As illustrated, an extension "6131" is associated with the telephone number that was selected in telephone directory section 140. Thus, this extension appears in extension display box 152. The option currently selected for issuing the extension is to issue the extension five seconds after issuing the telephone number. Other options for issuing the extension are illustrated in extension issuing options 154. Thus, once button 128 is activated for the second number in telephone number blocks 122, processor 92 will issue the telephone number to communication network 20. Then, processor 92 will wait five seconds before issuing the extension to communication network 20. The user of computer 32 may override the currently selected option for issuing the extension by selecting another one of the options in extension issuing options 154.

In certain embodiments, telephone directory 98 stores a preferred option for issuing the extension for each telephone data set in telephone directory 98. Thus, when a telephone number with an extension is selected in telephone directory section 140, the preferred option for issuing the extension can be preselected by program 96 in extension issuing options 154. In some of these embodiments, processor 92 determines the preferred option for issuing the extension for a particular telephone number and extension during a first telephone call to the telephone number and extension. Processor 92 then stores the option in telephone directory 98 in memory 94 for use the next time the telephone number and extension combination is selected in telephone directory section 140. In a particular embodiment, processor 92 determines the time period between issuing the telephone number and issuing the extension and uses this time period as the preferred option.

Computer 32 could also receive a telephone number and extension through by a variety of other techniques. For example, computer 32 could receive a telephone number and extension through activation of the buttons in manual dialer section 130 or through activation of the numeral or letter buttons on keyboard 110. As another example, computer 32 could receive the telephone number and extension through microphone 106. Computer 32 would then perform many of the previously discussed operations, such as displaying the received telephone number and extension in one of telephone number blocks 122, displaying the extension in extension dialer section 150, and issuing the telephone number and the extension to establish a communication path. Of course, the option desired for issuing the extension would have to be selected in extension issuing options 154. In certain embodiments, however, the option in extension issuing options 154 would default to issuing the extension on command if a telephone number and extension are received through one of these techniques. In addition, processor 92 can import telephone numbers with extensions from existing contact databases and parse them for the telephone number and extension. Thus, the invention contemplates any manner in which a telephone number and extension may be received by origination device 30. Moreover, computer 32 may record the telephone number and extension received in telephone directory 98 so that they can be retrieved from there the next time a telephone call is to be placed to the telephone number and the extension. Furthermore, computer 32 may learn the preferred extension issuing option when the telephone number and the extension are entered in any of these manners.

The present invention has several important technical features and advantages. To begin, origination device 30 is able to recognize when an extension is associated with a telephone number and provide options for issuing the extension. By recognizing an extension and providing options for issuing the extension, origination device 30 provides accurate issuance of the telephone number and extension, which reduces user input errors in placing telephone calls. Moreover, origination device 30 provides efficient electronic issuance of the telephone number and the extension. Origination device 30 also offers efficient issuance of the extension for certain destination devices by automating the issuance of the extension, relieving the user of origination device 30 from performing the function.

FIG. 4 illustrates an arrangement of the data in telephone directory 98 of memory 94. A variety of other arrangements could easily be used for telephone directory 98. Telephone directory 98 includes a plurality of telephone data sets 160*a–z* (generally referred to as telephone data sets 160). Each telephone data set 160 includes a name in name column 162, a telephone number and associated extension, if any, in number column 164, and extension issuing data in options data columns 170. Options data columns 170 include data columns 171–177, which specify the preferred option for issuing the extension in number column 164, if any, in extension issuing options 154 in extension dialer section 150. For example, for telephone data set 160*a,* data column 171 indicates that an automated attendant is associated with the telephone number of telephone data set 160*a*. In addition, data column 172 indicates that the extension is to be issued five seconds after the telephone number is issued. As another example, for telephone data set 160*f,* data column 171 indicates that there is no automated attendant associated with the telephone number of telephone data set 160*f,* and that the extension for telephone data set 160*f* is to be spoken on command, meaning the activation of button 157 in extension dialer section 150. Each option for issuing an extension in extension issuing options 154 can be specified using options data columns 170. For telephone data set 160*g,* no option for issuing an extension is specified because the telephone number in number column 164 for telephone data set 160*g* is a directly dialed number.

When one of the entries associated with one of the numbers in number column 164 is selected in telephone directory section 140 of UI 104, processor 92 determines whether an extension exists in the number. Processor 92 can do this in a variety of ways. For example, a parsing character, such as the character "x", could be inserted between the telephone number and the extension. Processor 92 would then search the data in number column 164 of the selected data set 160 for the parsing character and, upon detecting the parsing character, extract the telephone number and the extension by using anything after the parsing character as the extension and anything before the parsing character as the telephone number. A variety of other methods exist for processor 92 to determine and extract the extension associated with a telephone number.

Figure 5:
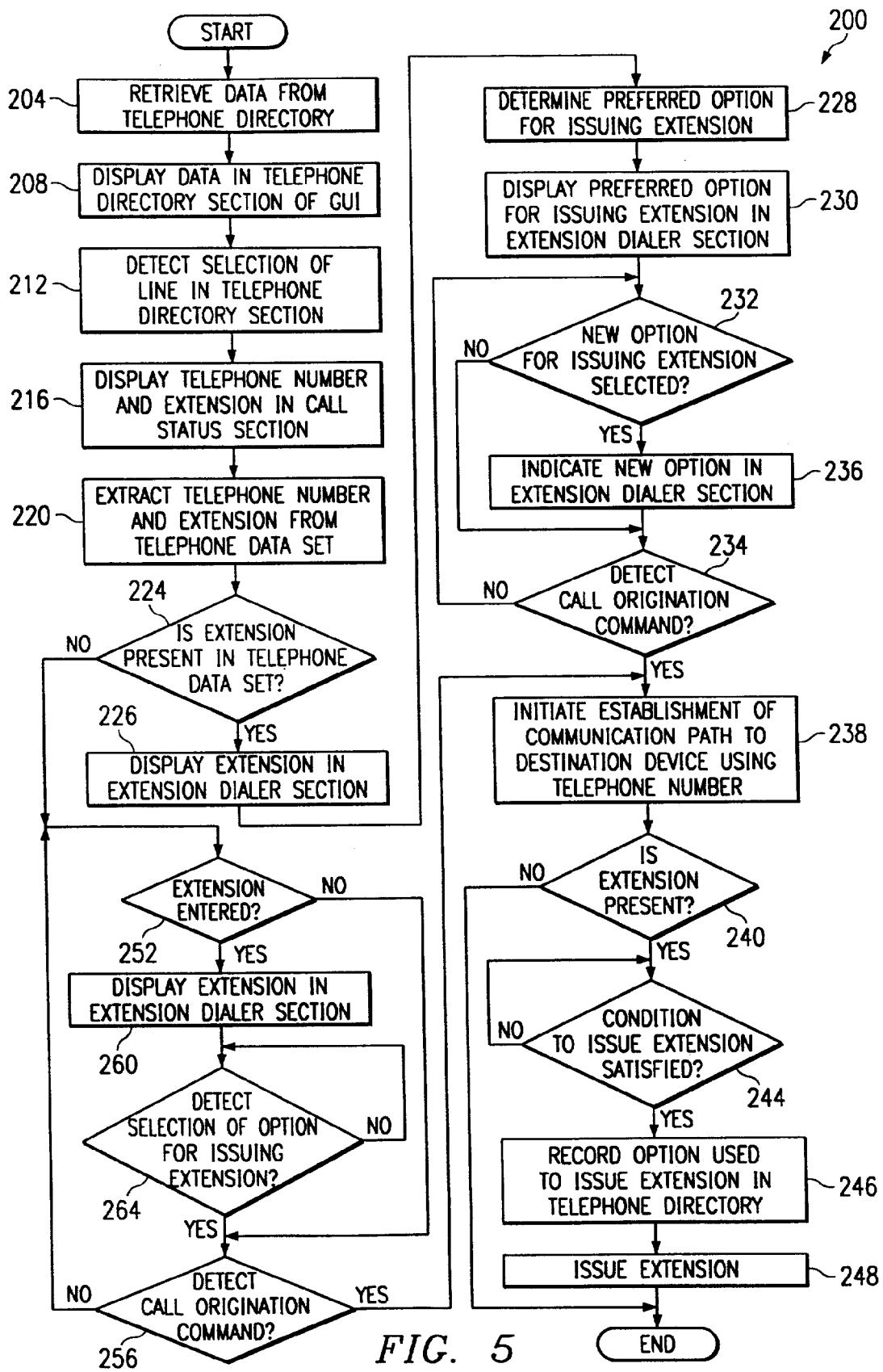
FIG. 5 shows a flowchart of the operations performed by the origination device to place a telephone call using a telephone number and an extension for one embodiment of the present invention.

FIG. 5 shows a flowchart 200 of the operations performed by origination device 30 to place a telephone call using a telephone number and an extension for one embodiment of the present invention. Note, although the following discussion uses destination device 40 as the destination device, any other destination device coupled to communication network 20 could be used in the following operations. During sequence 204, origination device 30 retrieves portions of the telephone data sets 160 in telephone directory 98 of memory 94. Origination device 30 displays the data in telephone directory section 140 of UI 104 in sequence 208. During sequence 212, origination device 30 detects the selection of an entry in telephone directory section 140. During sequence 216, origination device 30 displays the data from number column 164 in call status section 120. Origination device 30 extracts the telephone number and the extension, if any, from the data in number column 164 for the selected telephone data set 160 in telephone directory 98 during sequence 220. Origination device 30 determines if the data from number column 164 contains an extension during sequence 224.

If an extension is present in the data from number column 164, origination device 30 displays it in extension dialer section 150 of UI 104 at sequence 226. During sequence 228, origination device 30 determines the preferred option for issuing the extension, if any, based on the data in options data columns 170. Origination device 30 displays the preferred option for issuing the extension in extension dialer section 150 at sequence 230. During sequence 232, origination device 30 determines if a new option for issuing the extension has been selected. If a new option has been selected at sequence 232, origination device 30 indicates the new option for issuing the extension in extension dialer section 150 at sequence 236. During sequence 234, origination device 30 determines whether a call origination command has been detected. If a call origination command has not been detected at sequence 234, origination device 234 repeats sequence 232. If, however, a call origination command has been detected at sequence 234, origination device 30 proceeds to sequence 238.

During sequence 238, origination device 30 initiates establishment of a communication path to destination device 40 using the telephone number. Origination device 30 determines whether an extension is associated with the telephone number at sequence 240. If there is no extension associated with the telephone number, origination device 30 is finished with the communication path establishment process. If, however, an extension is associated with the telephone number, origination device 30 determines whether a condition to issue the extension has been satisfied at sequence 244, based on the option for issuing the extension selected in extension issuing options 154. Once origination device 30 determines that the condition to issue the extension has been satisfied at sequence 244, origination device 30 records the option used for issuing the extension in telephone directory 98 during sequence 246 and issues the extension to communication network 20 during sequence 248. Once the extension has been issued to communication network 20, origination device 30 is finished with the communication path establishment process.

If there was no extension present in the data from number column 164 at sequence 224, origination device 30 determines whether an extension has been entered, by any of a variety of methods previously discussed, at sequence 252. If an extension has been entered, origination device 30 displays the extension in extension dialer section 150 at sequence 260. Origination device 30 then waits to detect the selection of an option for issuing the extension at sequence 264. Upon selection of an option, origination device 30 proceeds to sequence 256. If, however, an extension has not been selected, origination device 30 proceeds also to sequence 256. At sequence 256, origination device 30 determines if a call origination command has been detected. If no call origination command has been detected, origination device 30 repeats sequence 252. If, however, a call origination command has been detected, origination device 30 proceeds to sequence 238.

Although several embodiments of the present invention have been discussed, a variety of additions, deletions, substitutions, and/or alterations may be readily suggested to one skilled in the art. It is intended that these additions, deletions, substitutions, and/or alterations be encompassed within the scope of the following claims.

What is claimed is:

1. A system for placing a telephone call using a telephone number and an extension, the system comprising:
    an origination device operable to receive a telephone number and an extension associated with a destination device, initiate the establishment of a communication path to the destination device by issuing the telephone number, determine whether a condition to issue the extension has been satisfied, and issue the extension to complete the establishment of the communication path if the condition has been satisfied;
    a communication network coupled to the origination device, the communication network operable to receive the telephone number, establish contact with the destination device based on the telephone number, receive the extension, and route the extension to the destination device; and
    the destination device, the destination device comprising:
        a first destination device coupled to the communication network; and
        a plurality of second destination devices coupled to the first destination device;
        wherein the first destination device is operable to be contacted through the communication network based on the telephone number, to receive the extension through the communication network, and to complete the establishment of the communication path based on the extension by selecting the appropriate second destination device to which to place the telephone call.

2. The system of claim 1, wherein:
    the first destination device comprises an automatic call distributor; and
    the second destination devices comprise telephones.

3. The system of claim 1, wherein the first destination device is further operable to initiate the sending of a response to the origination device upon being contacted through the communication network based on the telephone number.

4. The system of claim 3, wherein the response comprises an off-hook signal.

5. The system of claim 1, wherein the condition comprises detecting an appropriate response from the first destination device.

6. The system of claim 1, wherein the condition comprises detecting an appropriate response from the first destination device and determining whether a predetermined period of time after detecting the appropriate response has elapsed.

7. The system of claim 1, wherein the origination device issues the extension by communicating dual-tone multifrequency signals that represent the extension.

8. The system of claim 1, wherein the origination device issues the extension by communicating an audible voice request to connect to the extension.

9. The system of claim 8, wherein the origination device also issues the extension by communicating dual-tone multifrequency signals that represent the extension.

10. The system of claim 1, wherein the origination device issues the extension by communicating an audible voice request to connect to a name associated with the telephone number.

11. The system of claim 1, wherein the origination device receives a telephone number and an extension by:
    retrieving at least a portion of a telephone data set containing the telephone number and extension from a telephone directory;
    detecting an extension identifier in the portion of the telephone data set retrieved; and
    extracting the telephone number and the extension from the portion of the telephone data set based on the extension identifier.

12. The system of claim 11, wherein:
    the extension identifier comprises a parsing character; and
    extracting the telephone number and the extension from the portion of the telephone data set based on the extension identifier comprises reading the portion of the telephone data set before the parsing character as a telephone number and the portion of the telephone data set after the parsing character as the extension.

13. A method for placing a telephone call using a telephone number and an extension, the method comprising:
    receiving a telephone number and an extension associated with a destination device at an origination device;
    initiating the establishment of a communication path to the destination device by issuing the telephone number to a communication network;
    receiving the telephone number at the communication network;
    establishing contact with a first destination device of the destination device through the communication network based on the telephone number;
    determining at the origination device whether a condition to issue the extension has been satisfied;
    issuing the extension to complete the establishment of the communication path if the condition has been satisfied;
    receiving the extension at the communication network;
    routing the extension to the first destination device through the communication network;
    receiving the extension at the first destination device; and
    selecting the appropriate one of a plurality of second destination devices coupled to the first destination device to place the telephone call to based on the extension to complete the establishment of the communication path based on the extension.

14. The method of claim 13, wherein:
    the first destination device comprises an automatic call distributor; and
    the second destination devices comprise telephones.

15. The method of claim 13, further comprising initiating the sending of a response to the origination device by the first destination device upon being contacted through the communication network.

16. The method of claim 15, wherein the response comprises an off-hook signal.

17. The method of claim 13, wherein the condition comprises detecting an appropriate response from the first destination device.

18. The method of claim 13, wherein the condition comprises detecting an appropriate response from the first destination device and determining whether a predetermined period of time after detecting the appropriate response has elapsed.

19. The method of claim 13, wherein issuing the extension comprises communicating dual-tone multifrequency signals that represent the extension.

20. The method of claim 13, wherein issuing the extension comprises communicating an audible voice request to connect to the extension.

21. The method of claim 13, wherein issuing the extension comprises communicating an audible voice request to connect to a name associated with the telephone number.

22. The method of claim 21, wherein issuing the extension further comprises also communicating dual-tone multifrequency signals that represent the extension.

23. The method of claim 13, wherein receiving a telephone number and an extension comprises:
retrieving at least a portion of a telephone data set containing the telephone number and extension from a telephone directory;
detecting an extension identifier in the portion of the telephone data set retrieved; and
extracting the telephone number and the extension from the portion of the telephone data set based on the extension identifier.

24. The method of claim 23, wherein:
the extension identifier comprises a parsing character; and
extracting the telephone number and the extension from the portion of the telephone data set based on the extension identifier comprises reading the portion of the telephone data set before the parsing character as a telephone number and the portion of the telephone data set after the parsing character as the extension.

25. An apparatus for placing a telephone call using a telephone number and an extension, the apparatus comprising:
a memory operable to store a telephone number and an extension associated with a destination device;
a communication port adapted to be coupled to a communication network, the communication port-operable to exchange communications with the communication network; and
a processor coupled to the memory and the communication port, the processor operable to receive the telephone number and the extension, initiate the establishment of a communication path through the communication port to the destination device using the telephone number, the processor further operable to issue the extension to complete the establishment of the communication path if a condition to issue the extension has been satisfied.

26. The apparatus of claim 25, wherein the condition comprises detecting an appropriate response from the destination device.

27. The apparatus of claim 26, wherein the response comprises an off-hook signal.

28. The apparatus of claim 26, wherein the response comprises a verbal greeting.

29. The apparatus of claim 25, wherein the condition comprises the elapse of a predetermined period of time after initiating the establishment of the communication path.

30. The apparatus of claim 25, wherein the condition comprises detecting an appropriate response from the first destination device and determining whether a predetermined period of time to elapse after detecting the appropriate response has elapsed.

31. The apparatus of claim 25, wherein the condition comprises detecting a command to issue the extension.

32. The apparatus of claim 25, wherein the processor communicates dual-tone multifrequency signals through the communication port to issue the extension.

33. The apparatus of claim 25, wherein the processor communicates an audible voice request to connect to the extension through the communication port to issue the extension.

34. The apparatus of claim 33, wherein the processor also issues the extension by communicating dual-tone multifrequency signals that represent the extension.

35. The apparatus of claim 25, wherein the processor communicates an audible voice request to connect to a name associated with the telephone number through the communication port to issue the extension.

36. The apparatus of claim 25, wherein the apparatus comprises a computer executing phone emulation software that provides a user interface for selection of telephony functions.

37. The apparatus of claim 25, wherein:
the memory is further operable to store the telephone number and the extension as one of a plurality of telephone data sets in a telephone directory; and
the processor receives the telephone number and the extension by retrieving at least a portion of the telephone data set containing the telephone number and extension from the telephone directory, detecting an extension identifier in the portion of the telephone data set retrieved, and extracting the telephone number and the extension from the portion of the telephone data set based on the extension identifier.

38. The apparatus of claim 37, wherein:
the extension identifier comprises a parsing character; and
extracting the telephone number and the extension from the portion of the telephone data set comprises reading the portion of the telephone data set before the parsing character as a telephone number and the portion of the telephone data set after the parsing character as the extension.

39. The apparatus of claim 25, wherein the processor is operable to generate a user interface that displays options for issuing the extension.

40. The apparatus of claim 25, wherein the processor is further operable to:
determine the option used for issuing the extension during a first telephone call;
store the option in the memory; and
offer the stored option as the preferred option for issuing the selection the next time a telephone call is placed to the telephone number and the extension.

41. A method for placing a telephone call using a telephone number and an extension, the method comprising:
receiving a telephone number and an extension associated with a destination device;
initiating the establishment of a communication path to the destination device by issuing the telephone number;
determining whether a condition to issue the extension has been satisfied; and
issuing the extension to complete the establishment of the communication path if the condition has been satisfied.

42. The method of claim 41, wherein the condition comprises detecting an appropriate response from the destination device.

43. The method of claim 42, wherein the response comprises an off-hook signal.

44. The method of claim 42, wherein the response comprises a verbal greeting.

45. The method of claim 41, wherein the condition comprises the elapse of a predetermined period of time after initiating the establishment of the communication path.

46. The method of claim 41, wherein the condition comprises detecting an appropriate response from the destination device and the elapse of a predetermined period of time after detecting the appropriate response.

47. The method of claim 41, wherein the condition comprises detecting a command to issue the extension.

48. The method of claim 41, wherein issuing the extension comprises communicating dual-tone multifrequency signals.

49. The method of claim 41, wherein issuing the extension comprises communicating an audible voice request to connect to the extension.

50. The method of claim 41, wherein issuing the extension comprises communicating an audible voice request to connect to a name associated with the telephone number.

51. The method of claim 50, wherein issuing the extension further comprises also communicating dual-tone multifrequency signals that represent the extension.

52. The method of claim 41, wherein receiving a telephone number and an extension comprises:
storing the telephone number and the extension as one of a plurality of telephone data sets in a telephone directory;
retrieving at least a portion of the telephone data set containing the telephone number and the extension from the telephone directory;
detecting an extension identifier in the portion of the telephone data set retrieved; and
extracting the telephone number and the extension from the portion of the telephone data set based on the extension identifier.

53. The method of claim 52, wherein:
the extension identifier comprises a parsing character; and
extracting the telephone number and the extension from the portion of the telephone data set comprises reading the portion of the telephone data set before the parsing character as a telephone number and the portion of the telephone data set after the parsing character as the extension.

54. The method of claim 41, wherein the telephone number is associated with a first destination device and the extension is associated with a second destination device that is coupled to the first destination device.

55. The method of claim 41, further comprising:
determining the option used for issuing the extension during a first telephone call;
storing the option; and
offering the stored option as the preferred option for issuing the selection the next time a telephone call is placed to the telephone number and the extension.

56. The method of claim 55, wherein:
the option determined for issuing the extension comprises issuing the extension after a period of time has elapse since initiating the establishment of the communication path; and
offering the stored option as the preferred option comprises automatically issuing the extension after the time period.

57. A computer program embodied in a computer readable medium for placing a telephone call using a telephone number and an extension, the computer program operable to perform the following steps:
receiving a telephone number and an extension associated with a destination device;
initiating the establishment of a communication path to the destination device by issuing the telephone number;
determining whether a condition to issue the extension has been satisfied; and
issuing the extension to complete the establishment of the communication path if the condition has been satisfied.

58. The computer program of claim 57, wherein the condition comprises detecting an appropriate response from the destination device.

59. The computer program of claim 58, wherein the response comprises an off-hook signal.

60. The computer program of claim 58, wherein the response comprises a verbal greeting.

61. The computer program of claim 57, wherein the condition comprises the elapse of a predetermined period of time after initiating the establishment of the communication path.

62. The computer program of claim 57, wherein the condition comprises detecting an appropriate response from the destination device and the elapse of a predetermined period of time after detecting the appropriate response.

63. The computer program of claim 57, wherein the condition comprises detecting a command to issue the extension.

64. The computer program of claim 57, wherein issuing the extension comprises communicating dual-tone multifrequency signals.

65. The computer program of claim 57, wherein issuing the extension comprises communicating an audible voice request to connect to the extension.

66. The computer program of claim 65, wherein issuing the extension further comprises also communicating dual-tone multifrequency signals that represent the extension.

67. The computer program of claim 57, wherein issuing the extension comprises communicating an audible voice request to connect to a name associated with the telephone number.

68. The computer program of claim 57, wherein receiving a telephone number and an extension comprises:
storing the telephone number and the extension as one of a plurality of telephone data sets in a telephone directory;
retrieving at least a portion of the telephone data set containing the telephone number and the extension from the telephone directory;
detecting an extension identifier in the portion of the telephone data set retrieved; and
extracting the telephone number and the extension from the portion of the telephone data set based on the extension identifier.

69. The computer program of claim 68, wherein:
the extension identifier comprises a parsing character; and
extracting the telephone number and the extension from the portion of the telephone data set comprises reading the portion of the telephone data set before the parsing character as a telephone number and the portion of the telephone data set after the parsing character as the extension.

70. The computer program of claim 57, wherein the telephone number is associated with a first destination device and the extension is associated with a second destination device that is coupled to the first destination device.

71. The computer program of claim 57, further comprising:
  determining the option used for issuing the extension during a first telephone call;
  storing the option; and
  offering the stored option as the preferred option for issuing the selection the next time a telephone call is placed to the telephone number and the extension.

72. The computer program of claim 71, wherein:
  the option determined for issuing the extension comprises issuing the extension after a period of time has elapsed since initiating the establishment of the communication path; and
  offering the stored option as the preferred option comprises automatically issuing the extension after the time period.

* * * * *